(No Model.)
A. BODESCH.
FILTER.
No. 548,245. Patented Oct. 22, 1895.
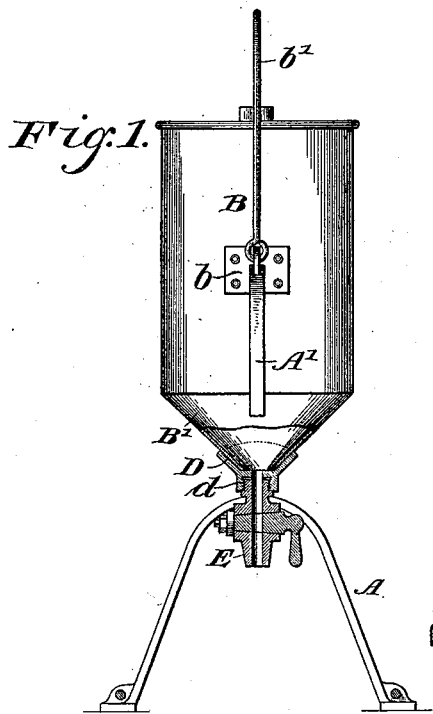
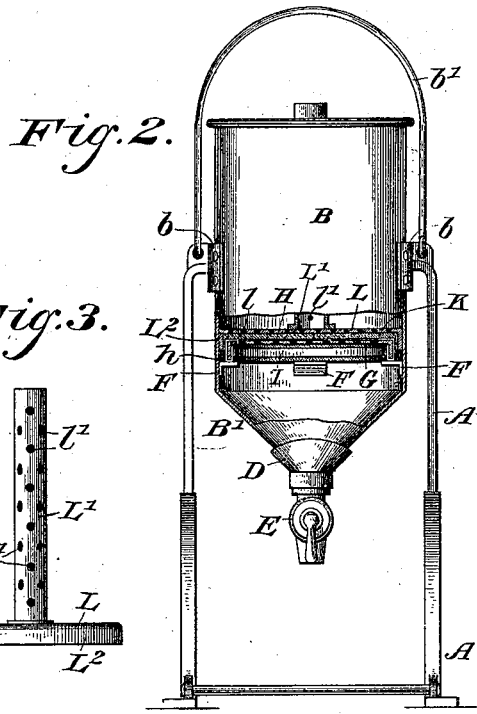
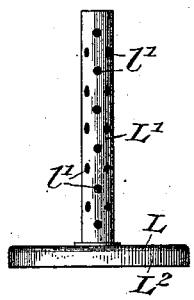
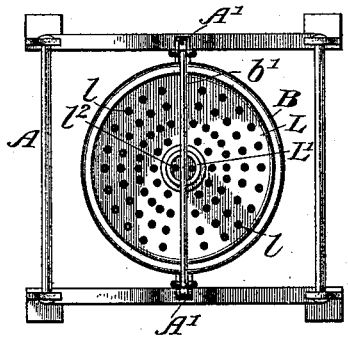
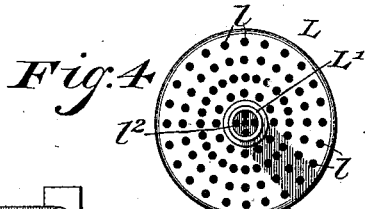
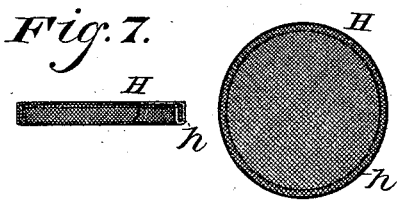
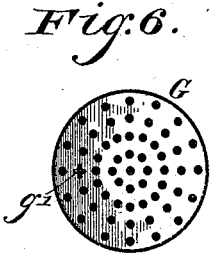
Witnesses:
J. M. Witherow
B. W. Miller
Inventor,
Adolf Bodesch,
By his Attorneys
Baldwin Davidson & Wight

UNITED STATES PATENT OFFICE.

ADOLF BODESCH, OF NEW YORK, N. Y.

FILTER.

SPECIFICATION forming part of Letters Patent No. 548,245, dated October 22, 1895.

Application filed January 5, 1895. Serial No. 533,965. (No model.)

*To all whom it may concern:*

Be it known that I, ADOLF BODESCH, a native of Hungary, and a subject of the Emperor of Austria-Hungary, at present residing in the city, county, and State of New York, have invented certain new and useful Improvements in Filters, of which the following is a specification.

The object of my invention is to provide an efficient filter for the filtration of water and all other fluids, as well as for the separation of fluid from some material suspended therein—as, for instance, wood pulp. I design that it shall be used in laboratories domestically for the filtration of water, and on a large scale for use in breweries and filtering-plants of water-works. Preferably the organization is such that the material that constitutes the primary portion of the filtering member, partition, or diaphragm may readily be removed and replaced. I also by preference use this material, which is of a fibrous character—such, for instance, as asbestos—in a finely-divided loose or flocculent state and mix it thoroughly with water or other fluid, and then after having placed in the filtering-vessel the lower member of the filtering-partition, which supports such finely-divided material, I place such material, mixed as stated, with the water or other liquid in the vessel and allow the water to gradually run off, thus causing the deposit of the fibers of the filtering material in a uniform relatively-loose layer. Over the layer thus formed is placed in the vessel the top or upper member of the filtering-diaphragm, which serves to retain the fibrous filtering material in position.

As another feature of my invention, I arrange within the vessel and supported by or forming part of the upper filter member a perforated tube that is preferably caused to extend beyond the mouth or opening of the vessel and is designed to contain ice, salt, or other material, as may be required for the special purpose in view.

The details of construction and one special form of the apparatus are illustrated in detail in the drawings, in which—

Figure 1 is a side elevation partly broken away and with the discharge-faucet in section; Fig. 2, a front elevation, partly broken away, showing the filtering-diaphragm in section; Fig. 3, a side elevation of the upper member of the filtering-partition and vertical tube; Fig. 4, a bottom plan view of the upper member of the filtering-partition; Fig. 5, a side elevation of the lower member of the filtering-partition; Fig. 6, a top plan view of the lower member of the filtering-partition. Fig. 7 is a side elevation of the lower member partly broken away; Fig. 8, a plan view of a woven cover that is placed over and secured to the lower filter member. Fig. 9 is a side elevation of the clamping-ring; Fig. 10, a plan of the clamping-ring, by means of which the woven cover is clamped to the lower member of the filter-partition. Fig. 11 is a plan view of the apparatus.

The drawings show an embodiment of the invention especially applicable to household use and laboratories, and it is constructed substantially as shown and as follows.

A indicates the frame having a rectangular base and uprights A' A', to the upper ends of which vessel B is attached, as indicated at $b$, or in any other suitable manner. A bail or handle $b'$ arches upwardly from such points of support over the top of the vessel and affords a means by which it may be readily removed as desired. The vessel B may be formed of any suitable material—for instance, metal, porcelain, stoneware—and it is cylindrical. The lower end B' is, however, tapering or conical, and upon the end thereof is secured a cap D, which may be of metal, cast or otherwise, and centrally bored and secured thereto, as at $d$. The cock or faucet E screws thereinto and is preferably so constructed as to discharge downwardly.

Within the vessel I preferably place three, four, or more brackets F upon the walls of the cylindrical part of the vessel to form supports for the filtering-diaphragm hereinafter described. These brackets might, however, be omitted and the shoulder formed by the tapering end utilized as a means of support.

The filtering-diaphragm is composed of the following parts: first, a flanged or cup-shaped plate G, that is formed with perforations through its flat face, and has preferably loosely attached to its upper face a small ring $g'$, by which it may be removed when desired. A woven cover H, having an upwardly-extending flange whose edge is turned or curled inwardly and then upwardly, as shown at $h$, so as to form an interior annular channel, is placed over the flanged perforated plate G, and the portion $h$ thereof embraces the flange. The woven cover is secured in place by an elastic split or divided ring I. The woven cover is preferably composed of some non-corrosive wire and is of a fineness of mesh adapted to the purpose intended and may have approximately the size of mesh indicated. The lower member of the filtering-partition composed of the parts G and H is placed in the cylinder and rests upon the brackets F. The primary or central member of the filtering-partition is indicated in Fig. 2 by the letter K, and is a layer of fibrous material and preferably of asbestos. It may be previously formed and placed over the woven part G, but is preferably formed in the following manner, which constitutes a feature of my invention: The fibrous material—as asbestos, for instance—is taken in a finely-divided, loose, or flocculent state and is mixed with water or other fluid, so as to form a mixture somewhat resembling that of paper-pulp before the water is separated therefrom in the formation of a sheet. It is then placed in the vessel, the cock E is opened, and the water allowed to run off gradually, causing an even deposit of the fibers upon the wires and within the meshes of the woven cover H and also around the periphery thereof. When this deposit has reached the desired thickness, the upper member of the filtering-partition is placed therein. This member (indicated in Figs. 3 and 4) consists of a flanged or cup-shaped plate L, formed with perforations $l$ through its flat face, and also preferably with a vertical tube L', having therein perforations $l'$. The flat face of L, included within the lower end of the tubular projection L', is also preferably perforated, as indicated at $l^2$. The flange $L^2$ of this member fits in the annular space formed between the periphery of the cover H and the wall of the cylindrical chamber, and as this annular space will be more or less filled or bridged over by the deposit of fibrous material a joint of sufficient closeness or one sufficiently well packed is attained. I have shown the perforated tube L' projecting above the top of the vessel and prefer so to make it. It may be provided with a cap or cover, as may also the vessel. The latter cover should, of course, have a central opening for the passage of the tube L'. I purpose placing, where the filter is used to filter drinking water, within the tube L', and I may place therein rock-salt or any other material with which it is desired to impregnate the filtered water.

A bucket, glass, or other receptacle may be placed beneath the faucet E, and the apparatus, according to its size and purpose for which it is designed, may be suitably placed on a table or shelf, or upon the floor, the frame A being of a proper height. With the organization of filter above described it is obvious that the filtering-partition may be removed and its members separated for the purpose of cleaning, and that the asbestos or other fibrous material may be thoroughly cleansed and redeposited in position in the manner described. The partition may be removed by grasping the perforated pipe L', and all the members of the partition may so adhere as to be lifted from the vessel in that way, or a rod might be inserted through the faucet and pressed upwardly to dislodge the partition.

In practice to obtain the best results I prefer in depositing the layer of fiber to place the upper perforated member of the partition in position while there is still a portion of liquid above the wire cover H and the deposited or precipitated fiber. The flange of the upper member L, as before stated, fits in the annular space between the wall of the vessel and the lower member of the partition, but the parts are so apportioned that the plate L does not press upon the fibrous filtering medium, which is therefore maintained in a relatively-loose condition. The asbestos fiber is particularly desirable, because it may be thoroughly cleansed. This may be done by removing the upper member of the partition, introducing water and thoroughly stirring up the fibers of asbestos, after which they may be removed, pressed relatively dry in a cloth bag, and finally heated to a high temperature in an oven to destroy any germs that may have lodged therein. When liquors, fusel-oils, or like liquids have been filtered, I should prefer to thoroughly boil the fiber which may be sufficient to cleanse it, or I may also heat it to a high temperature in an oven.

I claim as my invention—

1. The combination, substantially as set forth, of the vessel, the lower filter member supported therein and consisting of a perforated or reticulated plate G, a woven wire cover enveloping it, a filtering layer deposited upon the woven wire cover and composed of loose fibrous material, the upper member consisting of a perforated or reticulated plate L resting upon the layer of fibrous material, a vertical perforated tubular extension carried by the plate L, a fluid inlet above the member L, and a fluid outlet below the member G.

2. The combination, substantially as set forth, of the vessel, the lower member G of the filtering partition supported therein, which member consists of a flanged perforated plate and a woven wire cover enveloping the same, a filtering layer composed of fibrous material deposited upon said wire cover, the upper member of the filtering partition composed of a perforated plate L having a downwardly extending flange $L^2$ that surrounds the edge of the lower filtering member, a fluid inlet above the plate L, and a fluid outlet below the plate G.

3. The combination, substantially as set forth, of the vessel, the lower member of a filtering partition consisting of a flanged perforated plate G, a woven wire cover flanged or cup-shaped and having an inwardly turned edge as at $h$, which embraces the flange of the plate G, the filtering layer of fibrous material deposited upon the woven wire cover, the upper member of the filtering partition consisting of the perforated plate L, a fluid inlet above the plate L, and a fluid outlet below the plate G.

In testimony whereof I have hereunto subscribed my name.

ADOLF BODESCH.

Witnesses:
 FRANK S. OBER,
 SIGMOND STEIN.